United States Patent Office 2,992,164
Patented July 11, 1961

---

2,992,164
ION EXCHANGE SEPARATION OF GRAMICIDIN AND TYROTHRICIN
William Moses, Teaneck, N.J., assignor to S. B. Penick and Company, New York, N.Y., a corporation of Delaware
No Drawing. Filed July 13, 1959, Ser. No. 826,420
6 Claims. (Cl. 167—65)

The invention relates to a process for the isolation in high yield of pure gramicidin from tyrothricin, and is more especially concerned with the use of ion exchange resins in said process, and also to an improvement in converting amorphous gramicidin to the crystalline form.

Tyrothricin is a mixture of two antibiotic substances, gramicidin and tyrocidin, isolated from the culture medium of a tyrothricin producing microorganism. The tyrocidin fraction is inactivated to a considerable degree by serum, exudates, and body fluids, and hence plays a minor role in the action of tyrothricin. The active portion is the gramicidin, which is not appreciably affected by serum and which has widespread therapeutic utility.

Pure gramicidin melts at 228–231 degrees centigrade, with ultraviolet absorption in ethanol showing maxima at 2815, 2905, and 2710 and minima at 2475 angstrom units, and with its optical rotation in ethanol $[a]_D$ being $+5°$.

Several known methods are available for the separation of gramicidin from tyrothricin. Hotchkiss (Advances in Enzymology, volume 4, pp. 153 to 199, Interscience Publishers, Inc., New York, 1946) uses extraction of crude tyrothricin with a mixture of acetone and ethyl ether followed by crystallization of the gramicidin. Tishler (U.S. Patent 2,365,499) obtains gramicidin by continuous extraction with ethyl ether. Olcott and Fraenkel-Conrat (U.S. Patent 2,453,534) precipitate the tyrocidin from an ethanolic solution of tyrothricin, leaving the gramicidin in solution which is then precipitated by dilution with water to give an impure gramicidin. Baron (U.S. Patent 2,534,541) cites objections to the above processes and describes a method consisting of a benzene extraction of an aqueous alcoholic tyrothricin solution, followed by evaporation to an oily mass to which pentane is added. The resulting precipitate is dissolved in hot acetone and gramicidin is separated therefrom. Van Dolah et al. (U.S. Patent 2,528,022) describes a method for adsorbing the tyrocidin from an aqueous solution of tyrothricin upon a particular type of cation exchange resin thereby leaving an impure gramicidin fraction.

The process of the present invention, which involves the use of ion exchange resins for separating gramicidin, has the advantage that it can be accomplished quickly, without the detrimental effect of high temperatures, to give a product of high purity and in high yield. Another aspect of the inventive process is the technique used to obtain a quantitative conversion of amorphous gramicidin to the crystalline form by evaporation from aqueous acetone.

The instant process differs from prior art processes involving the use of ion exchange resins in that the desired antibiotic material is not adsorbed by the ion exchange resins, but passes through first a cation exchange resin column and then an anion exchange resin column, whereby the undesired tyrocidin and associated impurities are adsorbed leaving a solution containing only pure gramicidin. The instant process also differs from prior art processes involving the use of ion exchange resins in that: the starting tyrothricin is not in aqueous solution but rather in a special solvent system, i.e. an 80 percent aqueous methanol solution; no other solvents are required for any of the steps involving the ion exchange resins, nor is it necessary to control pH; no elution is required.

The inventive process requires the following basic steps: (1) A solution of tyrothricin dissolved in a solvent, especially aqueous alcohol, e.g. 80 percent by volume methanol and 20 percent by volume water, is passed through a column containing an acid cation exchange resin. (2) The effluent therefrom is then passed through a column containing a basic anion exchange resin. (3) The effluent therefrom is treated to recover gramicidin, either by known methods or by use of the novel modification which will be described below.

In order to insure recovery of the maximum possible amount of gramicidin, after the tyrothricin solution has been passed through the acid cation exchange resin column, the column is washed with the same solvent in which the tyrothricin was dissolved, e.g. 80 percent aqueous methanol, until the column has been freed of all occluded gramicidin. [To determine easily whether or not all occluded gramicidin has been removed, a small amount of the washing effluent is added to a small amount of a saturated sodium chloride solution. If turbidity results, this means the wash effluent still contains gramicidin and washing should be continued. If no turbidity is produced, this means the wash effluent does not contain gramicidin, and washing should be discontinued.] The wash water is then combined with the original effluent and both are passed through the basic anion exchange resin column. Again this column is washed with the the original solvent until all the gramicidin has passed through, with the determination being made by the above method. At this point, the effluent and washings from the basic anion exchange resin column, which contain the pure gramicidin, are combined.

The gramicidin may then be recovered therefrom by any one of several methods: (a) the effluent may be treated with a dilute aqueous salt solution, e.g. 1 percent aqueous solution of potassium carbonate, thereby precipitating gramicidin, and the precipitate recovered by conventional means, e.g. filtration, and washed with water, thereby yielding gramicidin in amorphous form; (b) the solvent is removed from the effluent by distillation or evaporation, leaving gramicidin in amorphous form.

Methods are known for converting amorphous gramicidin to the crystalline form, e.g. by recrystallization from acetone. However, no one has been able to convert more than about two-thirds of the amorphous gramicidin to the crystalline form. It has now been found, and is herein first described, that virtually quantitative conversion of amorphous gramicidin to crystalline gramicidin may be effected by dissolving the amorphous gramicidin in 2 percent (v./v.) aqueous acetone, boiling the solution, and crystallizing gramicidin therefrom.

The cation exchanger used to separate gramicidin from tyrothricin or appropriate tyrothricin-containing broths is an acid exchanger, preferably of the sulfonic acid type, and which preferably has a porosity range comparable to that obtained by cross linking from 1 percent to 4 percent of divinylbenzene with from 99 percent to 96 percent styrene, respectively. A typical useful agent of this type is the resinous cationic exchange resin containing acidic groups sold under the trade name "Dowex 50–X1" (Dow Chemical Company). In selecting a cation exchanger it is important that it have a relatively high capacity. To illustrate, four "Dowex 50" resins were tested to their capacity (amount of solids retained per 100 grams of resin used, when tyrothricin is dissolved in the solvent system of the present invention), with the results tabulated below:

| Resin Tested | Capacity per 100 Grams of Resin |
| --- | --- |
| "Dowex 50-X1" | 11.90 grams of solids. |
| "Dowex 50-X2" | 13.98 grams of solids. |
| "Dowex 50-X4" | 3.87 grams of solids. |
| "Dowex 50-X8" | 0.14 grams of solids. |

The two resins having the higher capacities produce a pure gramicidin and an efficient operation when used in applicant's process. The Dowex 50–X4 resin also gave a pure gramicidin but with a less efficient operation. The use of resins having a lower capacity than the latter resin resulted in impure gramicidin. The term "relatively high capacity" will be used to refer to capacities of approximately 3.87 grams of solids per hundred grams of resin and above which are the operative capacities for the cation exchange resins of the instant invention.

The anion exchanger used to further purify the gramicidin resulting from passage of tyrothricin through the cationic exchanger is a base exchanger, preferably of the quaternary ammonium type. A typical useful agent of this type is the resinous anionic exchange resin containing basic groups sold under the trade name "Dowex 2–X4" by the Dow Chemical Company.

The ratio of the amount of ion exchange resin to tyrothricin required for this process varies with the potency of the tyrothricin. The ratio is smaller for a high-potency tyrothricin than for one of low potency.

The preferred method of practicing the process of the invention comprises: (1) passing a solution of tyrothricin, prepared with tyrothricin from an appropriate stage in the tyrothricin recovery process, or with U.S.P. tyrothricin, through a column containing an acid cation exchanger of appropriate cross-linkage; (2) washing the column with solvent to free it of any occluded gramicidin; (3) passing the effluents from (1) and (2) through a second column containing a basic anion exchanger; (4) washing the column with solvent to free it of any residual gramicidin; (5) recovery of amorphous gramicidin from the combined effluents of (3) and (4) either by solvent removal or by the addition of an equal volume of salt solution, preferably a one percent potassium carbonate solution; (6) separation of the gramicidin from the mother liquor by filtration or by some other suitable means; (7) washing the precipitate with distilled water until the pH of the wash filtrate is constant; (8) drying the gramicidin precipitate in vacuo at 50°–70° C.; (9) dissolving the precipitate by heating from 2–10 minutes in a solvent consisting of acetone or aqueous acetone; (10) removing the solvent by evaporation, thereupon leaving behind crystalline gramicidin.

The following examples will illustrate the inventive process more specifically:

Example I

Sixty grams of tyrothricin (potency 125 percent of U.S.P. Reference Standard) is dissolved in 233 milliliters of 80 percent (v./v.) of aqueous methanol. Any insoluble material is removed by centrifugation or filtration and discarded. The solution is then allowed to pass through a column containing about 712 grams of Dowex 50–X1 at a rate of about 0.4 gallon per square foot per minute. The column is then washed with 80 percent aqueous methanol until the addition of 2 milliliters of effluent to 5 milliliters of a saturated sodium chloride solution fails to produce any turbidity. The effluent and washings are then passed through a column containing about 310 grams of Dowex 2–X4 at about 0.3 gallon per square foot per minute, and the column washed as above and to the same end-point. To the total volume of effluent, which is about 1800 milliliters, is added an equal volume of a 1 percent aqueous solution of potassium carbonate, and the resulting precipitate stored for about 18 hours at room temperature. The precipitate is separated from the mother liquor by filtration or any other suitable technique and the precipitate washed with distilled water until the pH of the filtrate is constant at about 6.5. Yield of the dried amorphous gramicidin is 12.56 grams (or 90.2 percent of the gramicidin content of the tyrothricin processed according to the foregoing). The precipitate is crystallized to give a product with the required melting point by dissolving and refluxing, at boiling temperature, in a solution of 2 percent (v./v.) aqueous acetone for 2 to 10 minutes. The gramicidin crystallizes in gel form from the acetone solution during storage at 5° C. for one hour. Most of the solvent is removed under vacuum at 30° C. until the gramicidin residue becomes brittle dry. The residue is milled and further dried for 1 to 3 hours at 20° C. under vacuum. The physical properties of this crystalline gramicidin product are as follows: M.P. 230–232° C. Optical rotation in U.S.P. ethanol $[a]_D = +6.0$. The ultraviolet absorption in ethanol exhibits a maximum at 282 mμ and a minimum at 247 mμ. The difference $$\Delta E_1^{1\%}{}_{m.}(282 \text{ max.}-247 \text{ min.})$$

between the extinction coefficients at these two wavelengths is not less than 76.0.

Example II

Eighty-three milliliters of an 80 percent aqueous methanolic solution containing 18.0 grams (incompletely purified) tyrothricin (potency 110 percent) is agitated for one hour at room temperature with 9.0 grams Darco S–51 (an activated carbon charcoal). The charcoal is separated from the mother liquor by filtration and the charcoal bed washed with 20 milliliters 80 percent aqueous methanol. An aliquot of the combined filtrate and wash containing 13.16 grams tyrothricin is then processed as in Example I. In this instance, the amounts of resins, solvents, precipitants, and other materials required for the isolation of gramicidin are reduced in proportion to the amount of tyrothricin being processed. The total yield of gramicidin is 2.83 grams, which is equivalent to 90 percent of the gramicidin content of the tyrothricin corresponding to 13.16 grams tyrothricin prior to treatment with Darco S–51. The physical properties of the product are comparable to those described in Example I.

Example III

Examples I and II are repeated up to and including passage of the tyrothricin solution through the columns. The gramicidin is recovered from the effluent by removal of the solvent by vacuum distillation. The residue which is pure amorphous gramicidin is dissolved in and crystallized from 2 percent (v./v.) aqueous acetone, as in Example I, to give crystalline gramicidin. Recovery of gramicidin is between 90 percent to 95 percent of theoretical. The physical properties of the gramicidin are similar to those described in Example I.

I claim:

1. A process for preparing crystalline gramicidin from tyrothricin comprising: dissolving tyrothricin in a solvent consisting of 80 percent methanol and 20 percent water by volume, passing the resulant tyrothricin solution successively through a polystyrene-sulfonic acid cation exchange resin cross-linked with about 1 to 4 percent divinylbenzene and having a capacity with respect to tyrocidin of more than 3.87 grams per 100 grams of said resin and a basic anion exchange resin, isolating the amorphous gramicidin from the effluent, and crystallizing the amorphous gramicidin.

2. The process of claim 1 wherein the anion exchange resin derives its exchange capacity from quaternary ammonium groups.

3. The process according to claim 1 wherein the amorphous gramicidin is isolated from the effluent by precipitation with potassium carbonate.

4. The process according to claim 1 wherein the amorphous gramicidin is isolated from the effluent by precipitation with potassium carbonate and crystallized from 2 percent aqueous acetone.

5. A process for preparing crystalline gramicidin from tyrothricin comprising: dissolving tyrothricin in a solvent consisting of 80 percent methanol and 20 percent water by volume, purifying the resultant solution by treatment with an activated charcoal, separating the charcoal from the tyrothricin-containing liquor, passing said liquor successively through a polystyrene-sulfonic acid cation exchange resin cross-linked with about 1 to 4 percent divinylbenzene and having a capacity with respect to tyrocidin of more than 3.87 grams per 100 grams of said resin and a basic anion exchange resin, isolating the amorphous gramicidin from the effluent, and crystallizing the amorphous gramicidin.

6. A process for separating gramicidin from tyrothricin comprising dissolving tyrothricin in a solvent consisting of 80 percent methanol and 20 percent water by volume, passing the resultant tyrothricin solution successively through a polystyrene-sulfonic acid cation exchange resin cross-linked with about 1 to 4 percent divinylbenzene and having a capacity with respect to tyrocidin of more than 3.87 grams per 100 grams of said resin and a basic anion exchange resin and isolating amorphous gramicidin from the effluent.

References Cited in the file of this patent

UNITED STATES PATENTS 2,534,541   Baron _____ Dec. 19, 1950

OTHER REFERENCES

Dubos et al.: J. Pediatrics, No. 1941, p. 593.

Calmon et al.: Ion Exchangers in Organic and Biochemistry, 1957, Interscience Pub. Inc., N.Y.C., pp. 229–317 and 502–519.

Olsen et al.: Nature, March 14, 1959, pp. 749–750.